3,304,216
METHOD OF MANUFACTURING
HOUSEHOLD UTENSILS
Earl Richard Eggleton, Warwick, R.I., assignor to Dixon Corporation, Bristol, R.I., a corporation of Rhode Island
No Drawing. Filed Mar. 19, 1964, Ser. No. 353,236
1 Claim. (Cl. 156—283)

This application is a continuation-in-part of copending application, Serial No. 273,848, filed April 18, 1963.

This invention relates to new and improved household utensils characterized by increased life and pleasant appearance. More particularly, this invention relates to a method of preparing polytetrafluoroethylene-coated cooking utensils in a manner such as to insure a greater service life and a resistance to discoloration in spite of repeated use.

Polytetrafluoroethylene-coated cookware and ovenware have been on the market for some time. There are many advantages to be gained by the use of such products. For example, because of the unique non-adhering properties of polytetrafluoroethylene, the use of polytetrafluoroethylene coatings on cooking utensils permit frying and baking without added oils or greases and also simplifies the cleaning of food handling equipment. Such products conventionally are composed of a metal base such as aluminum, copper, or stainless steel, or the like. The surface of the utensil to be contacted with the food products, such as the inside surface of a fry pan, is coated with a thin layer of polyetetrafluoroethylene by any of a variety of methods. Although these products have been on the market for a considerable length of time and have been given a considerable amount of advertising and publicity, they have not yet received an overwhelming reception by the consuming public. Although part of the reason for this lack of complete acceptance is probably based upon a fear of fluorine-containing materials, a larger portion of the sales resistance is probably due to the problem recognized in the December 1963 "Buyer's Guide" issue of Consumer Reports magazine. After use of the greaseless cookware, the cooking surface, previously white, tends to take on a dark discoloration which makes the cookware always appear to be dirty. The cause of the discoloration is well known to the industry, but to the best of the applicant's knowledge there has been no method heretofore devised for this discoloration. Another drawback, not mentioned by Consumer Reports but well known in the industry is that after moderate length of service, the polytetrafluoroethylene coating often tends to separate from the underlying metal surface.

The cause of both the discoloration and the separation arises from the nature of polytetrafluoroethylene. This material is at best difficult to adhere to other materials. Furthermore, unlike most other resins, polytetrafluoroethylene particles, upon heating to normal molding temperature, under normal pressures, do not melt and flow to any appreciable extent so that it is at best difficult to form a thin sheet or film of polytetrafluoroethylene of any appreciable size that is free from pinholes or other imperfections.

Accordingly, unless very stringent and economically unfeasible precautions are taken during manufacture of greaseless cookware, the final coated product will almost invariably contain a plurality of pinholes in the polytetrafluoroethylene surface and any greases or other liquid cooking materials present during the cooking operation invariably seep through the pinholes, and under the coating where they cannot be removed by washing. The presence of such materials under the thin polytetrafluoroethylene coating is responsible for the conventionally experienced discoloration. This presence of fats, oils, etc., and their decomposition products can also frequently result in an unpleasant odor being evolved. In time, sufficient cooking materials will infiltrate between the polytetrafluoroethylene surface and the metal surface to completely undermine the bond, causing the polytetrafluoroethylene to separate from the metal base and ultimately to break, thereby ending the value of the particular cooking utensil.

This discoloration and undermining tendency is equally pronounced regardless of the method previously employed for applying the coating. Thus the defect results with either the dispersion type of coating, such as is disclosed in U.S. Patent No. 2,944,917 to Cahne or in the various methods of adhering polytetrafluoroethylene films or sheets to metal either directly or through the use of various bonding layers. In some cases, the method of adhesion retards the tendency to separate but this has no effect on the discoloration.

In accordance with this invention, the deficiencies in the prior art procedures are eliminated by applying the polytetrafluoroethylene coating to the metal in the form of at least two thin films or sheets of polytetrafluoroethylene, one above the other. Any conventional method can be employed to anchor the bottom-most polytetrafluoroethylene film or sheet to the metal surface. Each of the two films or sheets should be of a thickness of from about 0.001" to about 0.004" and preferably from about 0.002" to about 0.003". Appreciably thinner polytetrafluoroethylene sheets are extremely difficult to handle and thicker sheets are generally economically undesirable. Through the use of this method, the discoloration and separation problems experienced when the prior art methods are employed is not obtained.

A very common method of manufacturing thin polytetrafluoroethylene sheets or films is through a skiving technique which is analogous to the conventional technique for manufacturing laminated woods. When polytetrafluoroethylene films are skived from the large molded billets conventionally employed, the polytetrafluoroethylene is oriented in the direction of skiving. With such skived films, it has been found that optimum results are obtained when the two films applied to the metal surface are applied one above the other in a manner such that the direction of orientation of one sheet is at an angle of from about 10° to about 90° to the direction of orientation of the second sheet.

The method of anchoring the lower-most of the two polytetrafluoroethylene sheets to the metal surface is not critical and thus does form a part of the invention. Obviously, the more durable anchoring techniques are preferred but since undermining by cooking materials, a normal problem inherent in the use of greaseless cookware, is substantially eliminated by the method of this invention, less satisfactory methods of adhesion can, although less desirably of course, be employed.

Although many of the prior art cementing techniques can be employed to adhere the lower-most film for adhesion to the metal surface, it is preferred to employ a polytetrafluoroethylene anchoring layer. The metal base can be suitably cleaned and/or roughened, if desired, and thereafter initially coated with a polytetrafluoroethylene anchoring layer which can be either continuous or discontinuous, as desired, and preferably has a thickness of between about 0.001 mm. and about 0.5 mm.

This anchoring layer can be applied in any desired manner. For example, a dispersion of polytetrafluoroethylene suspended in a suitable fluid can be applied, as by brushing, pouring, spraying or any other convenient method. A suitable dispersion for the initial coating is the polytetrafluoroethylene dispersion described in Patent No. 2,562,117. The polytetrafluoroethylene dispersion used to form the anchoring layer can be applied and can then be allowed to dry at room temperature or can be dried by heating at a temperature of from about 75° C. to about 125° C. for up to about fifteen minutes. If desired, the anchoring layer can be, but need not necessarily be, heated to the softening temperature of polytetrafluoroethylene, about 650° F.–800° F. to promote clarity and uniformity of thickness.

Another convenient method of forming the anchoring layer makes use of powdered polytetrafluoroethylene in place of the polytetrafluoroethylene dispersion. Powdered polytetrafluoroethylene having an average particle size of from about 15 to 50 mesh can be applied directly to the metal base to form the anchoring layer. The powder can be brushed on or spread by any means. As in the case of the dispersion-applied base layer, the anchoring layer applied in this manner need not be continuous and preferably will have a thickness of from about 0.001 mm. to about 0.5 mm. When the anchoring layer is formed by the application of a powder, no drying step is needed, and it is not necessary to heat the layer to the softening temperature of polytetrafluoroethylene.

In the practice of this invention, the anchoring layer adheres sufficiently to the metal base if the metal base is first slightly roughened, although stainless steel and aluminum can often be coated directly, apparently because they have somewhat more porous surfaces than many other metals.

The process of this invention is applicable to any metal or metal alloy or coated metal or metal alloy surface, for example, iron, steel, aluminum, copper, brass, bronze, nickel, nickel-chromium, chromium, zinc, cadmium, titanium, magnesium, tin, and German silver. Alumium is of particular interest commercially because of its ease of fabrication and lightness, thus making it particularly adapted for use in the manufacture of polytetrafluoroethylene-coated cooking utensils, such as pots, frying pans, and the like. Copper and steel are also of particular interest in this connection. The process also is applicable to coated metal surfaces such as porcelain, enamel coated ferrous and cuprous metals.

Preparatory for reception of the polytetrafluoroethylene anchoring layer, it is desirable to clean the metal surface. This can be done by application of a suitable cleaning solution, a solvent, such as halogenated hydrocarbon, for example, trichloroethylene or perchloroethylene. If the metal is resistant to oxidation, it can be heated in air at a temperature sufficiently high to burn off any dirt and other carbonaceous material adherent thereto. Aluminum, for example, can be cleaned by heating at 700° F. for approximately two hours. Suitable cleaning conditions are easily established for any metal as is well known in the art.

The clean metal surfaces are then roughened, if desired, for reception of the anchoring layer. Any method of roughening can be used, mechanical or chemical, such as oxidation, etching or anodizing,. Mechanically, this can be done by sand blasting or by surface scratching. A chemical method is an etch with an acid or base, the choice of which will depend upon the metal employed and its susceptibility to attack. Concentrated or dilute solutions of acids and bases can be used, and typical acids include, for example, hydrochloric acid, nitric acid, phosphoric acid, sulfuric acid, aqua regia, fuming sulfuric acid, chromic acid and sulfochromic acid. Typical bases include sodium hydroxide, potassium hydroxide, calcium hydroxide and barium hydroxide. Easily oxidized metals such as copper and aluminum can be oxidized, such as by a hydrochloric acid-ferric chloride solution, in the case of copper, or anodized in the case of aluminum.

The roughening can be quite superficial, since it is usually sufficient merely to roughen the base metal surface. The roughening conditions are in no way cirtical, and will depend upon the metal and treatment used. In a chemical treatment, the concentration of the treating agent, as well as the treatment temperature and time are variables to be considered. In general, the more concentrated the chemical agent, and the higher the temperature, the shorter the time required to produce a satisfactorily roughened surface. In the etching of aluminum and aluminum alloys, hydrochloric acid having a concentration of from 10 to 50% and sodium hydroxide having a concentration of from 10 to 20% are quite satisfactory. For bronze and steels, nitric acid or sulfuric acid are desirable, and these can be concentrated, if desired, or can be diluted to as low as 10%. Porcelain enamel-coated metal surfaces can be readily treated using hydrofluoric acid, and chromic acid can be used for light alloys and ferrous metals.

The thus cleaned and roughened metal surface is freed from any roughening agents in order to prepare it for reception of the polytetrafluoroethylene base layer as above indicated.

Suitable polytetrafluoroethylene dispersions are available commercially and usually include, in addition to the polytetrafluoroethylene, a wetting or emulsifying agent. U.S. Patent No. 2,534,058 discloses various aqueous dispersions of polytetrafluoroethylene and U.S. Patents Nos. 2,478,229 and 2,562,117 disclose other types of such dispersions. One form of aqueous dispersion available commercially contains approximately equal proportions of polytetrafluoroethylene and water with from 1.25% to 1% of an alkyl sulfate, such as the sodium salt of the sulfuric acid ester of lauryl alcohol.

After application of the anchoring layer and any drying or heating operations that may be required, the two polytetrafluoroethylene sheets or films are then applied. Each polytetrafluoroethylene sheet or film, which is preferably self-supporting, must, of course, be continuous in so far as this is possible, although each will of course almost invariably contain some pinholes. When the sheet or film is not self-supporting, it can be supported temporarily on a backing sheet from which it is transferred. The two films of polytetrafluoroethylene are successively applied to the anchoring layer and pressure is applied to provide intimate contact between the surfaces. Pressure can be applied either in two steps, one step after the application of the first film and the other step after the application of the second film or merely after application of the two films. It is preferred to apply pressure only after both films have been applied. Usually pressure is within the range of from about 1 to about 2,000 pounds per square inch at a temperature above the softening temperature of polytetrafluoroethylene at that pressure. Temperatures within the range from about 650° F. to about 800° F. are adequate. It is desirable while cooling the laminate thus prepared to maintain a pressure sufficient to keep the polytetrafluoroethylene films and the anchoring layer in contact so that the films will not separate from the anchoring layer during cooling. The pressure initially applied can thus be continued until the laminate is cooled to room temperature. If desired, rapid quenching can be employed.

It is generally preferred to shape the final product after the polytetrafluoroethylene has been applied. This makes the application of pressure during the coating step much simpler. The laminates prepared can then be fabricated into polytetrafluoroethylene cooking utensils of all kinds using conventional metal-working techniques applicable to the metal in question such as stamping, pressing, goldforming, spinning, drying, molding, and the like. Exemplary cooking and eating utensils include pots, pans, trays, baking dishes, forms, and the like. If desired, however, this method can easily be adapted for coating already formed utensils.

The method of forming the polytetrafluoroethylene films employed in this invention is not critical, although as aforesaid, when skived film is employed, it is preferred to take the orientation of the successive films into account. However, other methods of forming polytetrafluoroethylene sheets or films such as casting, extrusion, calendaring, etc., can be employed and orientation need not be taken into account. Although two films successively applied are quite sufficient for yielding optimum results; if desired, of course, additional layers can be employed.

The following example, in the opinion of the inventor, illustrates the preferred mode of carrying out the invention.

*Example*

An aluminum sheet was cleaned with trichloroethylene. Thereafter, powdered polytetrafluoroethylene, having an average particle size of 30 mesh, was brushed onto the sheet to form an optically uniform coating having a thickness of 0.1 mm. Thereafter, two films of polytetrafluoroethylene, approximately 0.0025″ thick each, were skived from a large billet and each sheet was applied successively. The first sheet was applied directly over the powdered polytetrafluoroethylene layer and the second sheet was applied over the first in a manner such that the direction of orientation of the particles in the second sheet was at a right angle to the direction of orientation of the first sheet. Thereafter, the assembly was placed between the jaws of a heated press and maintained at a temperature of 750° F. for twenty minutes at an applied pressure of 600 p.s.i. The assembly was then removed from the press and allowed to cool to room temperature. The resulting product was then formed into a fry pan in which the polytetrafluoroethylene coating was on the food-containing side. This fry pan was observed to retain its white color indefinitely despite repeated use for frying various types of foods.

The skived sheets employed in this invention were conventionally prepared. In this technique, as is well known, powdered polytetrafluoroethylene is compressed and molded under a pressure of about 2,500 pounds per square inch. The exact dimensions of the billets molded for skiving are relatively unimportant and depend only upon the characteristics of the equipment. The particular billets in this instance had dimensions of 9½″ O.D. x 3¾″ I.D. x 13″ long. After the billets had been formed, they are generally sintered in the oven for 36 hours, gradually raising the temperature during the first five or six hours to 700° F., holding at that temperature for 24 hours and then cooling for about six hours. The billet to be skived, after removal from the oven, is mounted on a skiving lathe which is similar to an ordinary lathe except that the cross-feed is so arranged to properly hold a skiving blade. The billet rotates toward the blade and the blade is moved in toward the billet at a regular rate. By adjusting the speed so that the skiving blade moves toward the billet, various thicknesses of the material can be skived.

It is also possible to slit to exact width during the skiving operation. Alternatively, slitting can take place in a subsequent operation. As the tape is skived, it is rolled up on a mandrel.

Having thus described the invention, that which is claimed is as follows:

A method of manufacturing household utensils characterized by resistance to discoloration and a greater service life which comprises cleaning and roughening a metal surface, applying powdered polytetrafluoroethylene to form an anchoring layer without heating to the softening temperature of polytetrafluoroethylene, applying a first preformed sheet of polytetrafluoroethylene, applying a second preformed sheet of polytetrafluoroethylene, angularly oriented with respect to said first sheet, each of said sheets having a thickness of from about 0.001 inch to about 0.003 inch and then heating at a temperature within the range from about 650 to 800° F. with the application of pressure to anchor the preformed layers to each other and to the metal base.

References Cited by the Examiner

UNITED STATES PATENTS

| | | | |
|---|---|---|---|
| 2,484,484 | 10/1949 | Berry | 156—333 |
| 2,562,117 | 7/1951 | Osdal | 260—29.6 |
| 2,728,698 | 12/1955 | Rudner | 161—189 X |
| 2,944,917 | 7/1960 | Cahne | 117—49 |
| 2,984,599 | 5/1961 | Edwards et al. | 156—333 |

EARL M. BERGERT, *Primary Examiner.*

HAROLD ANSHER, *Examiner.*